United States Patent
Yamada et al.

(10) Patent No.: US 7,384,096 B2
(45) Date of Patent: Jun. 10, 2008

(54) WEATHER STRIP

(75) Inventors: Yoshinobu Yamada, Aichi-ken (JP); Kazuki Sawada, Handa (JP)

(73) Assignees: Toyoda Gosei Co., Ltd, Nishikasugai-gun, Aichi-ken (JP); Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 11/523,575

(22) Filed: Sep. 20, 2006

(65) Prior Publication Data

US 2007/0069553 A1 Mar. 29, 2007

(30) Foreign Application Priority Data

Sep. 27, 2005 (JP) .......................... P-2005-279162

(51) Int. Cl.
*B60J 10/12* (2006.01)
(52) U.S. Cl. ................................. 296/216.06
(58) Field of Classification Search ............................. 296/216.06–216.08
See application file for complete search history.

(56) References Cited

U.S. PATENT DOCUMENTS

| | | | |
|---|---|---|---|
| 4,927,208 A * | 5/1990 | Farmont | 296/216.06 |
| 6,685,263 B2 | 2/2004 | Sawada et al. | |
| 6,969,111 B2 * | 11/2005 | Ota | 296/213 |
| 6,988,766 B2 * | 1/2006 | Yamada | 296/216.06 |
| 2004/0227380 A1 | 11/2004 | Ota et al. | |
| 2004/0232733 A1 | 11/2004 | Ota | |
| 2005/0001458 A1 | 1/2005 | Yamada | |

FOREIGN PATENT DOCUMENTS

JP 7-35142 6/1995

* cited by examiner

*Primary Examiner*—Dennis H Pedder
(74) *Attorney, Agent, or Firm*—McGinn IP Law Group, PLLC (57) ABSTRACT

An extruded portion of a roof weather strip includes a base portion fixed to a frame base portion and a seal portion projecting upward from the base portion. The seal portion is provided with a front side portion extending toward an outer periphery of the opening from the base portion and a rear side portion connecting a distal end of the front side portion with the base portion. A first boundary portion between the front side portion and the rear side portion is located on an outer peripheral side of the opening with respect to a connecting portion between the rear side portion and the base portion, so that the rear side portion is made to be deformed toward the outer peripheral side of the opening when the roof panel is closed.

6 Claims, 6 Drawing Sheets

Prior Art

WEATHER STRIP

BACKGROUND OF THE INVENTION

1. Field of the Invention

The present invention relates to a weather strip that is mounted on an peripheral part of an opening in the roof of an automobile.

2. Related Art

Conventionally, there have been cases where a sunroof system is provided in a roof of an automobile. In general, the sunroof system includes a roof panel which opens and closes an opening provided in the roof. In recent years, there are sunroof systems in which a plurality of roof panels are provided correspondingly to openings provided in a roof of an automobile, and in this case, a weather strip is provided to establish a seal between the adjacent roof panels (for example, refer to JP-UM-A-7-35142).

Figure 6:
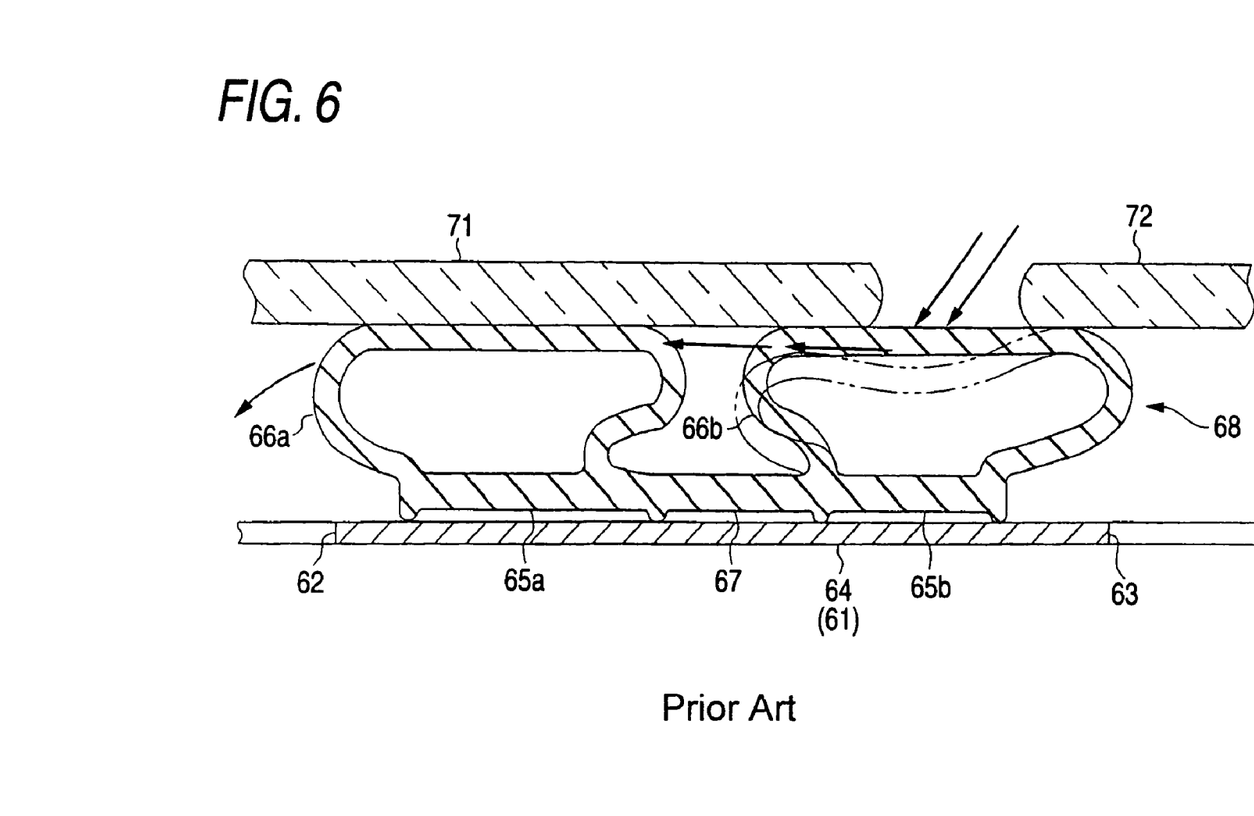
FIG. 6 is a sectional view which shows the configuration of a conventional roof weather strip.

The weather strip described in JP-UM-A-7-35142 is such as to be mounted on an edge of each roof panel. Apart from this technique, it is also considered that a weather strip is mounted on a frame base member which divides an opening in the roof into a plurality of openings. To describe this technique based on a specific example, as shown in FIG. 6, a first opening 62 and a second opening 63 are formed in a roof 61 of an automobile, and a movable roof panel 71 is provided correspondingly to the first opening 62 in such a manner as, for example, to slide, while a roof panel 72 is provided correspondingly to the second opening 63 so as to be stationary relative to the opening 63. In addition, a roof weather strip 68 is provided on a frame base member 64 which separates the first opening 62 from the second opening 63 which is provided with a first base portion 65a and a second base portion 65b which are mounted on the frame base member 64, a first seal portion 66a and a second seal portion 66b which are hollow and which project upward from the base portions 65a, 65b, respectively, and a connecting portion 67 which connects together the first base portion 65a and the second base portion 65b. In addition, when the roof panel 72 is mounted, the roof panel 72 and the second seal portion 66b are brought into contact with each other, so as to establish a seal between the roof panel 72 and the frame base member 64. In addition, when the movable roof panel 71 is closed, the movable roof panel 71 and the first and second seal portions 66a, 66b are brought into contact with each other, so as to establish a seal between the movable roof panel 71 and the frame base member 64.

When employing the configuration that has been described above, however, when the vehicle is subjected to a high pressure washing, highly pressurized water collides against the second seal portion 66b as indicated by thick arrows in FIG. 6, whereby the second seal portion 66b is deformed as indicated by chain double-dashed lines in the same figure, causing a risk that the highly pressurized water penetrates between the second seal portion 66b and the first seal portion 66a. Here, the first seal portion 66a is collapsed to be deformed through contact with a lower surface of the movable roof panel 71, and a "space" having an acute cross section is formed in a boundary portion between the first seal portion 66a and the movable roof panel 71. As this occurs, the first seal portion 66a and the movable roof panel 71 are forced to be separated from each other from where the aforesaid "space" is formed by the highly pressurized water that has so penetrated, leading to a concern that the water might enter the passenger compartment of the vehicle.

SUMMARY OF THE INVENTION

The invention was made with a view to solving the problem, and an object thereof is to provide a weather strip which can ensure further a seal along a peripheral part of a roof panel which opens and closes an opening in the roof of an automobile.

Hereinafter, individual aspects of the invention will be itemized for description. Note that specific functions and advantages to the corresponding aspect of the invention will be added thereto as required.

First aspect of the invention provides a weather strip mounted on a peripheral part of a substantially rectangular opening formed in a roof of an automobile to be closed by a movable roof panel, comprising:

a base portion fixed to the peripheral part of the opening and a hollow seal portion projecting upward from the base portion, wherein when the movable roof panel is closed, the hollow seal portion is brought into contact with the movable roof panel and deformed to seal between the movable roof panel and the peripheral part of the opening;

the hollow seal portion including:

an inner peripheral side portion which extends from an inner peripheral edge of the opening or in a vicinity thereof in the base portion toward an outer peripheral side of the opening, and an outer peripheral side portion connected to a distal end of the inner peripheral side portion to form a boundary portion between the inner peripheral side portion and the outer peripheral side portion, and connected to the base portion so that the hollow seal portion projects upward from the base portion;

wherein the boundary portion is brought into contact with the movable roof panel when the movable roof panel is closed, and the boundary portion is located on an outer peripheral side of the opening with respect to a connecting portion between the outer peripheral side portion and the base portion, whereby when the movable roof panel is closed, the outer peripheral side portion is deformed to be folded toward the outer peripheral side of the opening.

According to the first aspect of the invention, the boundary portion between the inner peripheral side portion and the outer peripheral side portion which constitutes a bending point of the seal portion locates on an outer peripheral side of the opening with respect to the connecting portion between the outer peripheral side portion and the base portion, and when the movable roof panel is closed, the outer peripheral side portion is deformed to be folded toward the outer peripheral side of the opening rather than deformed in a compressed shape. Consequently, the acute space is made difficult to be formed between the movable roof panel and the outer peripheral side portion such that the movable roof panel is closed.

In addition, since the outer peripheral side portion is folded toward the exterior side from the vehicle compartment, in the event that the outer peripheral side portion is subjected to stress such as by highly pressurized water attempting to enter from the outer peripheral side of the opening, a stress directed toward the movable roof panel side comes to be applied to the outer peripheral side portion, whereby the boundary portion and the movable roof panel are brought more strongly and firmly into press contact with each other. Consequently, the risk can be suppressed that water or the like enters the passenger compartment from a space between the seal portion and the movable roof panel.

In addition, the inner peripheral side portion is desirably formed into the shape in which it projects to the exterior side of the vehicle compartment rather than a shape in which it sinks into a hollow space in the seal portion. As this occurs, the outer peripheral side portion can be made to tilt and collapse toward the outer peripheral side of the opening more assuredly.

Second aspect of the invention provides a weather strip as set forth under the first aspect of the invention, wherein the outer peripheral side portion includes a base portion-side section which extends from the base portion toward the outer peripheral side of the opening and a distal end-side section which connects a distal end of the base portion-side section with the distal end of the inner peripheral side portion, and the distal end-side section extends in a direction which intersects a contact surface of the movable roof panel at substantially right angle when the movable roof panel is closed.

According to the second aspect of the invention, such that the movable roof panel is closed, the distal end-side section extends in the direction which intersects the contact surface of the movable roof panel at substantially right angles, whereby a situation in which stress due to highly pressurized water is applied concentrically to the boundary portion between the outer peripheral side portion and the contact surface of the movable roof panel can be suppressed properly compared to a case in which an angle formed by the distal end-side section and the contact surface of the movable roof panel becomes acute. As a result, the risk can be suppressed more assuredly that water or the like enters the passenger compartment from a space between the seal portion and the movable roof panel.

Third aspect of the invention provides a weather strip mounted on a frame base member which divides a substantially rectangular opening formed in a roof of an automobile into a first opening and a second opening, the weather strip comprising:

a first base portion fixed to the frame base member, and a first hollow seal portion projecting upward from the first base portion;

a second base portion fixed to the frame base member, and a second hollow seal portion projecting upward from the second base portion; and a connecting portion which connects the first base portion and the second base portion to each other, wherein, when a roof panel closes the second opening, the second seal portion is brought into contact with the roof panel so as to be deformed to seal between the roof panel and the frame base member, when a movable roof panel closes the first opening, the first seal portion and the second seal portion are brought into contact with the first movable roof panel and deformed to seal between the movable roof panel and the frame base member;

wherein the first hollow seal portion includes:

a first inner peripheral side portion which extends from an inner peripheral edge of the first opening or in a vicinity thereof in the first base portion toward an outer peripheral side of the opening, and a first outer peripheral side portion connected to a distal end of the first inner peripheral side portion to form a first boundary portion between the first inner peripheral side portion and the first outer peripheral side portion, and connected to the first base portion so that the first hollow seal portion projects upward from the base portion;

wherein the second hollow seal portion includes:

a second inner peripheral side portion which extends from the second base portion toward the first seal portion, and a second outer peripheral side portion connected to a distal end of the second inner peripheral side portion to form a second boundary portion between the second inner peripheral side portion and the second outer peripheral side portion, and connected to an inner peripheral edge of the second opening or in a vicinity thereof in the second base portion, so that the second hollow seal portion projects toward the first seal portion;

wherein when the roof panel is closed, the roof panel is brought into contact with the second outer peripheral side portion, and when the movable roof panel is closed, the movable roof panel is brought into contact with the first boundary portion and the second outer peripheral side portion;

wherein the second boundary portion locating on a side where the first seal portion is provided with respect to a connecting portion between the second inner outer peripheral side portion and the second base portion so that the second outer peripheral side portion is deformed to be folded toward the first seal portion, when the movable roof panel is closed, and the first boundary portion is located on an outer peripheral side of the first opening with respect to a connecting portion between the first outer peripheral side portion and the first base portion, so that the first outer peripheral side portion is deformed to be folded toward the outer peripheral side of the first opening, when the movable roof panel is closed.

According to the third aspect of the invention, the first boundary portion between the first inner peripheral side portion and the first outer peripheral side portion which constitutes a bending point of the first seal portion locates on the outer peripheral side of the first opening with respect to the connecting portion between the first outer peripheral side portion and the first base portion. As a result, the same function and advantage of the first aspect of the invention are provided.

In addition, according to this third aspect of the invention, the second boundary portion between the second inner peripheral side portion and the second outer peripheral side portion which constitutes a bending point of the second seal portion locates on the inner peripheral side of the first opening with respect to the connecting portion between the second inner peripheral side portion and the second base portion. Due to this, the second inner peripheral side portion is made easier to fall toward the first seal portion about the connecting portion between the second inner peripheral side portion and the second base portion. Consequently, when the second seal portion (the second outer peripheral side portion) is subjected to stress such as by highly pressurized water or the like pouring from above, the second inner peripheral side portion aggressively deforms while tilting and falling toward the first seal portion. Thus, the highly pressurized water or the like is guided to the vicinity of the a proximal end portion of the first outer peripheral side portion or the connecting portion by the second seal portion which is folded toward the first seal portion side. Consequently, a situation in which highly pressurized water or the like is brought into direct collision with the boundary portion between the movable roof panel and the first seal portion (the first outer peripheral side portion) can be made difficult to occur, and as a result, the risk that water enters the passenger compartment from a space between the movable roof panel and the first seal portion can be suppressed more assuredly.

Fourth aspect of the invention provides a weather strip according to the third aspect of the invention, the first outer peripheral side portion includes a base portion-side section which extends from the first base portion toward the outer peripheral side of the first opening and a distal end-side section which connects a distal end of the base portion-side section with a distal end of the first inner peripheral side portion, the distal end-side section extending in a direction which intersects a contact surface of the movable roof panel at substantially right angle when the movable roof panel is closed.

According to the fourth aspect of the invention, in addition to the function and advantage of the third aspect of the invention, the same function and advantage as those of the second aspect of the invention are provided.

Fifth aspect of the invention provides a weather strip according to the first or second aspect of the invention, wherein the outer peripheral side portion is made thicker than the inner peripheral side portion.

According to the fifth aspect of the invention, the repulsive force of the outer peripheral side portion can be increased which acts when the movable roof panel is closed, and the contact pressure between the boundary portion between the outer peripheral side portion and the inner peripheral side portion and the movable roof panel can be increased. Consequently, the sealing properties between the seal portion and the movable roof panel can be increased, so as to prevent the risk that water or the like enters the passenger compartment more assuredly.

Sixth aspect of the invention provides a weather strip according to the third or fourth aspect of the invention, only the boundary portion between the inner peripheral side portion and the first outer peripheral side portion is brought into contact with the movable roof panel in the first seal portion.

According to the sixth aspect of the invention, the repulsive force of the first seal portion which acts when the movable roof panel is closed is applied concentrically to the boundary portion between the first inner peripheral side portion and the first outer peripheral side portion, so as to increase the contact pressure between the boundary portion between the first inner peripheral side portion and the first outer peripheral side portion and the movable roof panel. Consequently, the sealing properties between the first seal portion and the movable roof panel can be increased, so as to prevent the risk that water or the like enters the passenger compartment more assuredly.

DETAILED DESCRIPTION OF THE PREFERRED EMBODIMENTS

Figure 1:
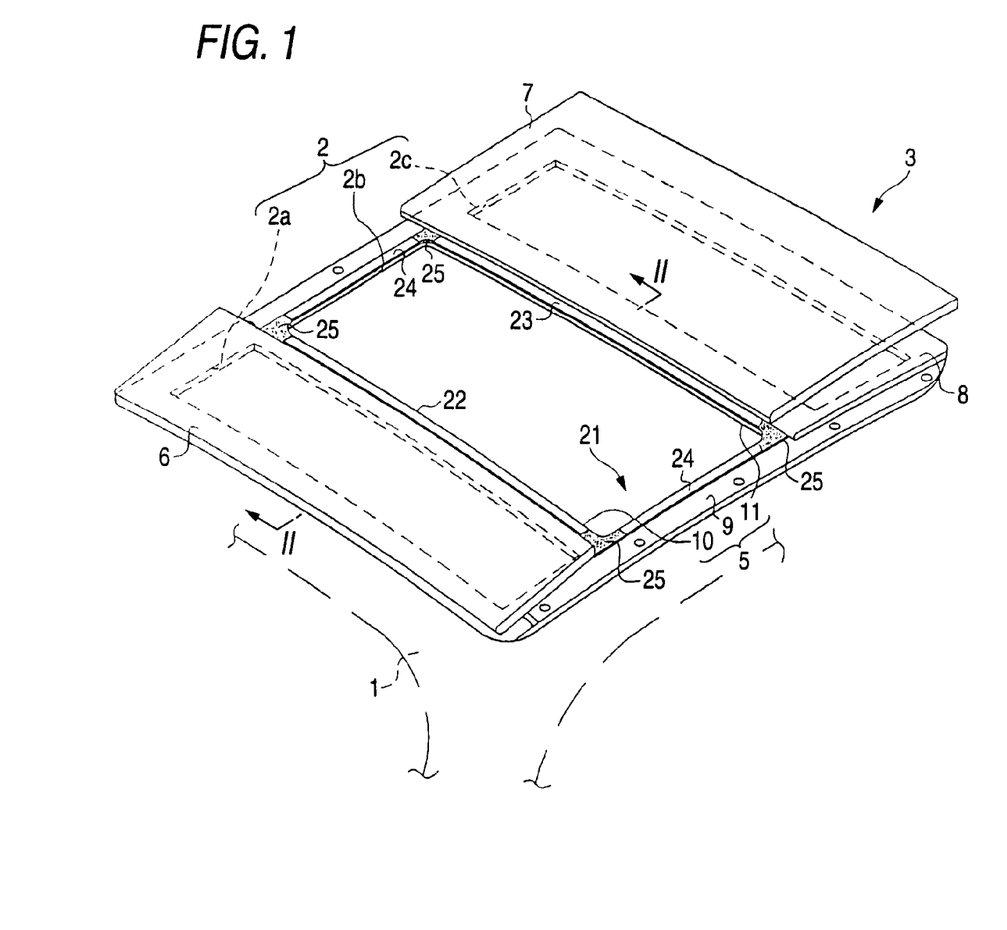
FIG. 1 is a partial perspective view which shows schematically the configuration of a roof of an automobile which includes a sunroof system.
Figure 2:
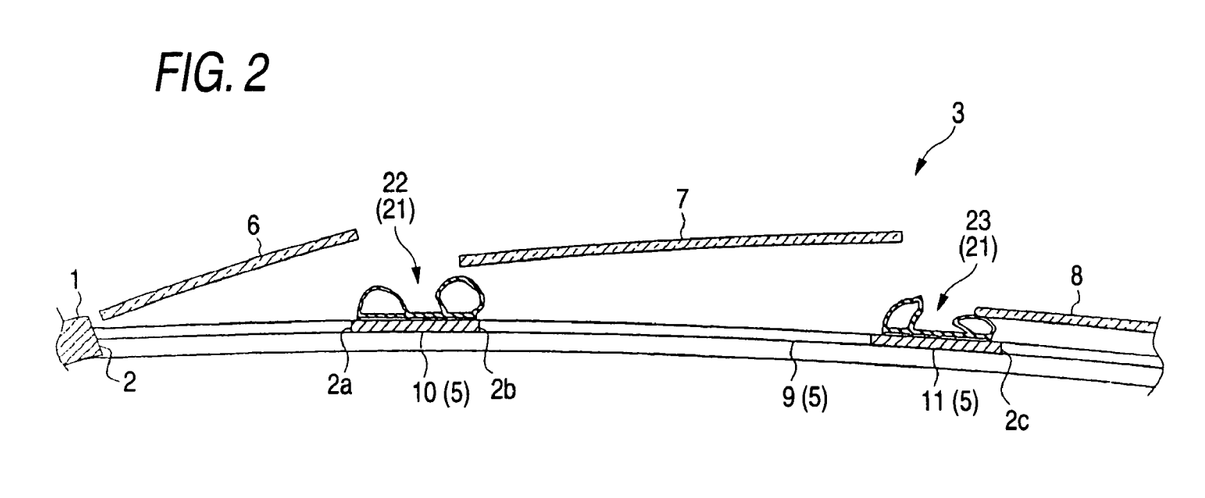
FIG. 2 is a sectional view taken along the line II-II in FIG. 1 which shows exemplarily the sunroof system.

Hereinafter, an embodiment of a weather strip which is mounted on a peripheral part of an opening in a roof of an automobile will be described by reference to the accompanying drawings. FIG. 1 is a partial perspective view which shows schematically the configuration of a roof an automobile which includes a sunroof system. FIG. 2 is a sectional view taken along the line II-II in FIG. 1 which shows exemplarily the sunroof system.

As shown in FIGS. 1, 2, a substantially rectangular opening 2 is formed in a roof (a ceiling portion) of an automobile, and furthermore, a sunroof system 3 is provided so as to cover the opening 2. The sunroof system 3 includes a frame 5 which is mounted on a peripheral part portion of the opening 2, a first roof panel 6, a second roof panel 7 and a third roof panel 8.

The frame 5 includes a substantially rectangular outer frame 9 which is provided along a peripheral part of the opening 2, and a first frame base portion 10 and a second frame base portion 11 which connect together a pair of side portions of the outer frame 9 which extend in a longitudinal direction of the automobile. The opening 2 is divided into three openings such as a front opening 2a, an intermediate opening 2b and a rear opening 2c, which are arranged in that order as viewed from a front side of the vehicle, by the first frame base portion 10 and the second frame base portion 11. In addition, the first roof panel 6 is provided correspondingly to the front opening 2a, the second roof panel 7 is provided correspondingly to the intermediate opening 2b, and the third roof panel 8 is provided correspondingly to the rear opening 2c. Note that in this embodiment, the intermediate opening 2b corresponds to the opening and the first opening, and the rear opening 2c corresponds to the second opening. In addition, the second roof panel 7 corresponds to the movable roof panel, and the third roof panel 8 corresponds to the roof panel. Furthermore, the second frame base portion 11 makes up the frame base member.

Additionally, the first roof panel 6 is configured so as to tilt up and down at a rear portion substantially about a front edge portion functioning as a rotational axis center by means of a driving mechanism, not shown. The front opening 2a is opened and closed by virtue of the action of this first roof panel 6. The second roof panel 2 is configured so as to not only move slightly in a vertical direction as a whole but also slide in the longitudinal direction while kept in a raised position by means of a driving mechanism, not shown. The intermediate opening 2b is opened and closed by virtue of the action of the second roof panel 7. The third roof panel 8 is mounted in a stationary manner relative to the frame 5. In addition, in this embodiment, the individual roof panels 6, 7, 8 are provided with glass panels. Instead of the glass panels, resin or metallic panels may, of course, be applied.

Next, a schematic configuration of a roof weather strip 21 will be described which is mounted along a peripheral part of the intermediate opening 2b. Note that as has been described above, the intermediate opening 2b is defined by the first frame base portion 10 at its front side and by the second frame base portion 11 at its rear side.

As shown in FIG. 1, most longitudinal portions of the roof weather strip 21 are provided with extruded portions. Here, a front (left in FIG. 1) side portion is denoted as an extruded portion 22, a rear (right in FIG. 1) side portion as an extruded portion 23 and left and right side portions as extruded portions 24. In addition, corner portions (portions scattered with dots in FIG. 1) of the roof weather strip 21 are provided with molded portions 25. Since this embodiment is characterized by the rear extruded portion 23 of the roof weather strip 21, hereinafter, the configuration of the relevant portion will be described.

Figure 3:
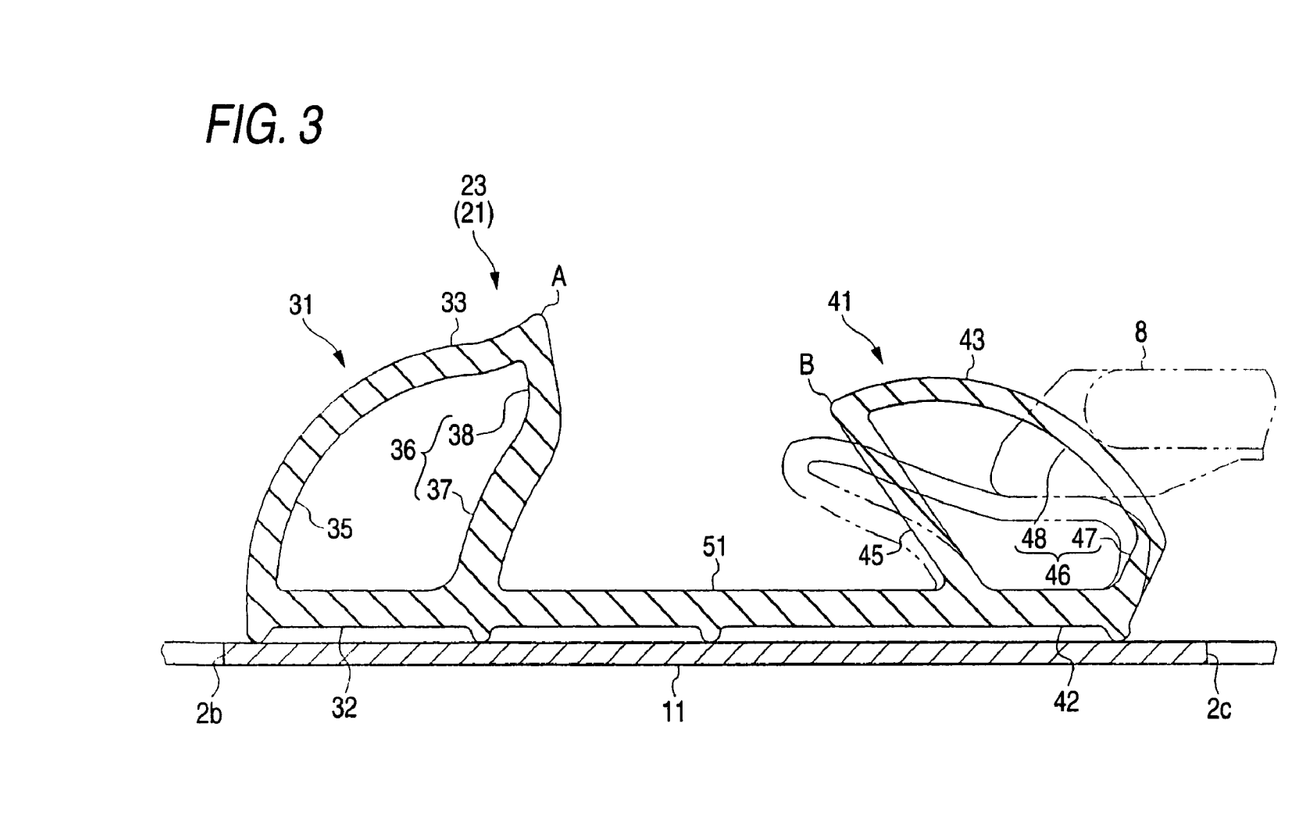
FIG. 3 is a sectional view which shows the configuration of a roof weather strip.

As shown in FIG. 3, the extruded portion 23 includes a front seal member 31, a rear seal member 41 and a connecting portion 51 which connects both the seal members 31, 41 together. The front seal member 31 includes a first base portion 32 which is formed into a flat plate-like shape and is adapted to be mounted on the frame 5 (the second frame base portion 11), a first seal portion 33 which is hollow and is formed integrally with the first base portion 32 so as to project toward the outside of the vehicle (upward). In addition, although not shown, mounting holes are provided on the second frame base portion 11 at predetermined intervals, while insertion holes are provided on the first base portion 32 so as to correspond to the mounting holes, whereby the front seal member 31 is fixed to the second frame base portion 11 by inserting and locking clips in the mounting holes and the insertion holes (alternatively, the front seal member 31 may be fixed to the second frame base portion 11 with a pressure sensitive adhesive double coated tape or the like).

The rear seal member 41 includes a second base portion 42 which is formed into a flat plate-like shape and is adapted to be mounted on the second frame base portion 11 and a second seal portion 43 which is hollow and is formed integrally with the second base portion 42 so as to project upward. In this embodiment, the rear seal member 41 is fixed to the second frame base portion 11 by means of a pressure sensitive adhesive double coated tape, not shown, which is affixed to a lower surface of the second base portion 42 (alternatively, the rear seal member 41 may, of course, be fixed to the second frame base portion 11 by means of clips or the like). In addition, the first seal portion 33 and the second seal portion 43 are made of EPDM (ethylene-propylene-diene terpolymer) sponge rubber. In addition, the connecting portion 51 connects together a rear edge of the first base portion 32 and a front edge of the second base portion 42.

Figure 4:
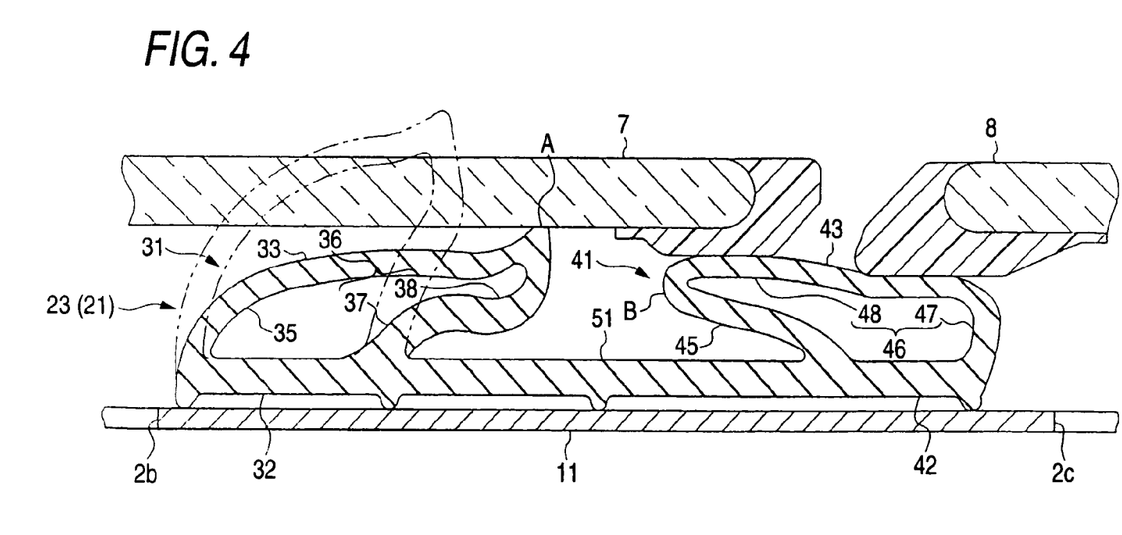
FIG. 4 is a sectional view which shows the configuration of the roof weather strip when a second roof panel is in a closed state.

In addition, in the extruded portion 23 that has the configuration described above, when the second roof panel 7 is closed, the first seal portion 33 and the second seal portion 43 are brought into contact with the second roof panel 7 to thereby be deformed, whereby a seal is established between the second frame base portion 11 and the second roof panel 7 (refer to FIG. 4). Additionally, while the third roof panel 8 has already been described as being mounted in a stationary manner relative to the rear opening 2c, such that the third roof panel 8 is so mounted, as shown in chain double-dashed lines in FIG. 3, the second seal portion 43 is brought into contact with the third roof panel 8 to thereby be deformed, whereby a seal is formed between the second frame base portion 11 and the third roof panel 8. In addition, such that the second roof panel 7 is closed, a slight gap is designed to be formed between the second roof panel 7 and the third roof panel 8 (refer to FIG. 4). Additionally, a region between the first seal portion 33 and the second seal portion (a region which is surrounded by the first seal portion 33, the second seal portion 43 and the connecting portion 51) is made to also function as a drain for carrying rain water or the like which penetrates into the relevant region to the outside of the vehicle.

Now then, as shown in FIG. 3 and the like, the first seal portion 33 of the embodiment is provided with a first front side portion 35 which projects upward from the vicinity of a front edge of the base portion 32 in a curved fashion so as to extend rearward (toward an outer periphery of the intermediate opening 2b) and a first rear side portion 36 which connects a distal end of the first front side portion 35 with the first base portion 32 and is formed to be bent so as to project upward at a first boundary portion A between the first front side portion 35 and the first rear side portion 36. In this embodiment, the first rear side portion 36 is formed thicker than the first front side portion 35. The first rear side portion is provided with a first lower side portion 37 which extends upward from the first base portion 32 while tilting slightly rearward and a first upper side portion 38 which connects a distal end of the first lower side portion 37 with the distal end of the first front side portion 35. In this embodiment, the first boundary portion A is located further rearward (rightward in FIG. 3) than a connecting portion between the first lower side portion 37 and the first base portion 32. Note that in this embodiment, the first front side portion 35 corresponds to the first inner peripheral side portion (the inner peripheral side portion), and the first rear side portion 36 corresponds to the first outer peripheral side portion (the outer peripheral side portion). In addition, the first lower side portion 37 corresponds to the base portion-side section, and the first upper side portion 38 corresponds to the distal end-side section.

In addition, the second seal portion 43 of the rear seal member 41 is provided with a second front side portion 45 which extends forward (toward the first seal portion 33) from the second base portion 42 and a second rear side portion 46 which connects a distal end of the second front side portion 45 with the vicinity of a rear edge (an edge locating to the rear opening 2c) of the second base portion 42 and is formed to be bent so as to project forward at a second boundary portion B between the second front side portion 45 and the second rear side portion 46. The second rear side portion 46 is provided with a second lower side portion 47 which extends upward from the vicinity of the rear edge of the second base portion while tilting slightly rearward and a second upper side portion 48 which connects a distal end of the second front side portion 45 with a distal end of the second lower side portion 47. In this embodiment, the second boundary portion B between the second front side portion 45 and the second upper side portion 48 is located further forward than a connecting portion between the second front side portion 45 and the second base portion 42. In addition, the second boundary portion B is located further upward than a boundary portion between the second lower side portion 47 and the second upper side portion 48. Note that in this embodiment, the second front side portion 45 corresponds to the second inner peripheral side portion, and the second rear side portion 46 corresponds to the second outer peripheral side portion.

Additionally, as with the extruded portion 23, the front extruded portion 22 (refer to FIG. 2) includes first and second base portions and first and second seal portions, but cross-sectional shapes thereof are different from those of the extruded portion 23 (here, a further description thereof will be omitted). In addition, the extruded portion 24 includes only a first base portion and a first seal portion. Cross-sectional shapes thereof are different from those of the extruded portion 23.

Next, the deforming operation of the first seal portion 33 and the second seal portion 43 will be described by reference to FIG. 4 which occurs such that the second roof panel 7 is closed. Note that the intermediate opening 2b is opened when the second roof panel 7 moves upward as a whole from the closed state and thereafter slides toward the rear. In addition, the intermediate opening 2b is closed when the second roof panel 7 slides forward until it is located at a position where the second roof panel 7 faces the intermediate opening 2b and thereafter moves downward to a position where the second roof panel 7 is brought into contact with the first seal portion 33 and the second seal portion 43.

Firstly, an operation related to the first seal portion 33 will be described which occurs when the second roof panel 7 is closed. When the second roof panel 7 is put in a closed state, the first seal portion 33 is brought into contact with the second roof panel 7 in the first boundary portion A and is then subjected to stress applied from the second roof panel 7. Being triggered by this, the first rear side portion 36 is deformed so as to be folded rearward about the connecting portion between the first rear side portion 36 and the first base portion 32. In addition, the first upper side portion 38 comes to extend in a direction which intersects a lower surface of the second roof panel 7 at substantially right angle. Note that in this embodiment, in the first seal portion 33, only the first boundary portion A is brought into contact with the second roof panel 7 even such that the second roof panel 7 is closed completely.

Next, an operation related to the second seal portion 43 will be described. When the second roof panel 7 is put in the closed state, the second seal portion 43 is brought into contact with the second roof panel 7 at a front side of the second upper side portion 48 (further forward than the connecting portion between the second front side portion 45 and the second base portion 42) and is then subjected to a stress applied from the second roof panel 7. Being triggered by this, the second front side portion 45 is deformed so as to be folded forward about the connecting portion between the second front side portion 45 and the second base portion 42.

Figure 5:
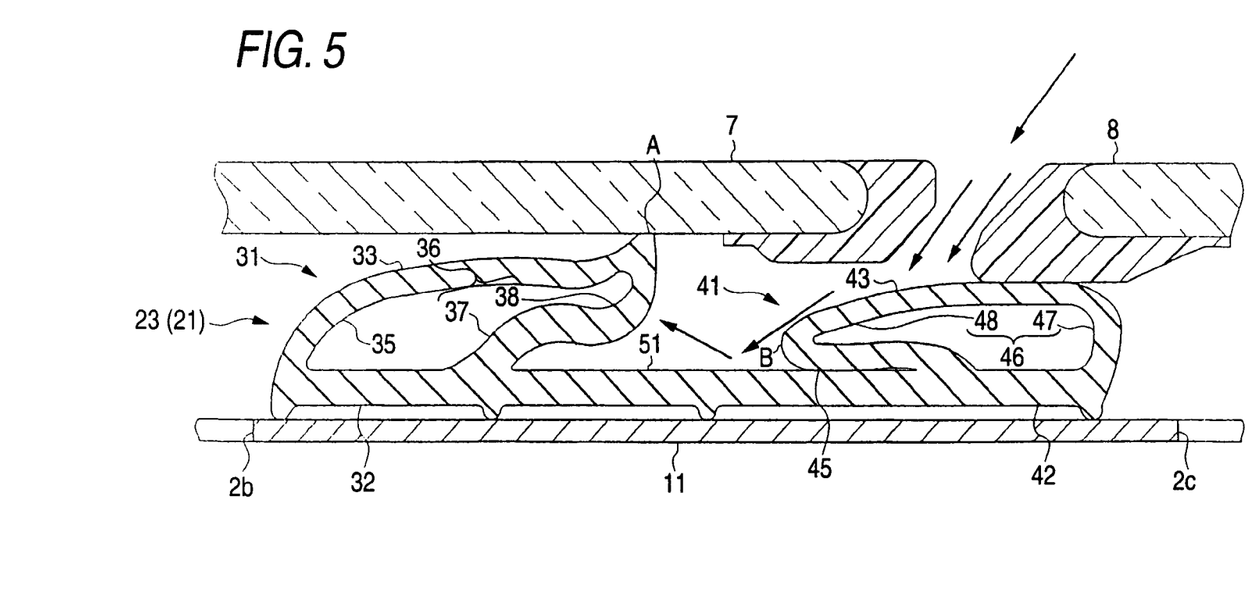
FIG. 5 is an explanatory view which explains the deforming operation of seal portions during high pressure washing of a vehicle.

Next, the deforming operation of the first seal portion 33 and the second seal portion 43 during a high pressure washing of the vehicle, as well as the function and advantage thereof will be described by reference to FIG. 5. Note that thick arrows described in the same figure denote the flow of highly pressurized water.

As shown in the same figure, during a high pressure washing of the vehicle, highly pressurized water collides against the second seal portion 43 (the second upper side portion 48) which is exposed between the second roof panel 7 and the third roof panel 8, and a space between the second seal portion 43 and the second roof panel 7 is forced to be opened by virtue of stress applied from the highly pressurized water, leading to a concern that the highly pressurized water penetrates between the first seal portion 33 and the second seal portion 43. Here, as has been described above, since the second boundary portion B locates further forward than the connecting portion between the second front side portion 45 and the second base portion 42, the second front side portion 45 is made easier to be deformed by being folded toward the front. In addition, the highly pressurized water is guided toward the vicinity of a base portion of the first lower side portion 37 of the first seal portion 33 and the connecting portion 51 by the second seal portion 43 which is deformed as a result of the front side portion 45 folded toward the front. Consequently, the situation in which the highly pressurized water collides directly against the boundary portion between the second roof panel 7 and the first seal portion 33 can be made difficult to occur, and a as a result, the risk can be prevented that water enters the passenger compartment of the vehicle from a space between the second roof panel 7 and the first seal portion 33.

In addition, there exists a concern that the first seal portion 33 is subjected to stress resulting from the highly pressurized water which has entered from a space between the second roof panel 7 and the third roof panel 8 at the first rear side portion 36. In this case, too, since the first boundary portion A is located further rearward than the connecting portion between the first rear side portion 36 and the first base portion 32 as has been described above and the first lower side portion 37 is inclined toward the rear, a stress directed upward comes to act on the first rear side portion 36 in the event that the first rear side portion 36 is subjected to stress resulting from the highly pressurized water, whereby the first seal portion 33 and the second roof panel 7 are brought more strongly and firmly into press contact with each other. As a result, the risk can be prevented that water enters the passenger compartment of the vehicle more assuredly.

Furthermore, as has been described above, the first upper side portion 38 extends in the direction which intersects the lower surface of the second roof panel 7 at substantially right angles, whereby a situation in which stress resulting from the highly pressurized water is applied concentrically to a boundary portion between the first upper side portion 38 and the lower surface of the second roof panel 7 can be suppressed properly compared to, for example, a case where an angle formed by the first upper side portion 38 and the lower surface of the second roof panel 7 is acute. As a result, the risk can be prevented more assuredly that water enters the passenger compartment of the vehicle.

In addition, in this embodiment, the first rear side portion 36 is made thicker than the first front side portion 35, whereby the repulsive force of the first rear side portion 36 can be increased which is produced when the second roof panel 7 is closed, thereby making it possible to increase the contact pressure between the first boundary portion A which is a boundary portion between the first front side portion 35 and the first rear side portion 36 and the second roof panel 7. Furthermore, in this embodiment, in the first seal portion 33, only the first boundary portion A is brought into contact with the second roof panel 7, whereby the repulsive force of the first seal portion 33 produced when the second roof panel 7 is closed is added concentrically to the first boundary portion A, thereby making it possible to increase the contact pressure between the first boundary portion A and the second roof panel 7. Consequently, the sealing properties between the first seal portion 33 and the second roof panel 7 can be increased, thereby making it possible to prevent the risk that water or the like enters the passenger compartment of the vehicle more assuredly.

Note that the invention is not limited to the embodiment that has been described heretofore but may be carried out in the following manners. Of course, other applications and modifications which will not be illustrated below can be applied.

(a) While in the embodiment, the first upper side portion 38 is extended in the direction which intersects the lower surface of the second roof panel 7 at substantially right angle such that the second roof panel 7 is closed, the first upper side portion 38 may extend while tilting slightly toward the rear.

(b) While in the embodiment, the invention is applied to the roof weather strip (the extruded portion 23) which forms the seal between a rear edge portion of the second roof panel 7 and a front edge portion of the third roof panel 8, the invention is not limited thereto and hence may be applied to weather strips that are mounted on the other roof panels. For example, the invention may be applied to the weather strip (the extruded portion 22) which forms a seal between a rear edge of the first roof panel 6 and a front edge of the second roof panel 7. Of course, the invention is not limited to the configuration which includes the three roof panels and hence, a configuration may be applied in which only one roof panel (a movable roof panel) is provided for the roof 1, so that the aforesaid configuration may be applied to a weather strip which seals a peripheral part of the roof panel.

What is claimed is:

1. A weather strip mounted on a peripheral part of a substantially rectangular opening formed in a roof of an automobile to be closed by a movable roof panel, comprising:
a base portion fixed to the peripheral part of the opening; and
a hollow seal portion projecting upward from the base portion, wherein when the movable roof panel is closed, the hollow seal portion is brought into contact with the movable roof panel and deformed to seal between the movable roof panel and the peripheral part of the opening;
the hollow seal portion including:
an inner peripheral side portion which extends substantially from an inner peripheral edge in the base portion toward an outer peripheral side of the opening, and
an outer peripheral side portion connected to a distal end of the inner peripheral side portion to form a boundary portion between the inner peripheral side portion and the outer peripheral side portion, and connected to the base portion so that the hollow seal portion projects upward from the base portion;
wherein the boundary portion is brought into contact with the movable roof panel when the movable roof panel is closed, and
the boundary portion is located on an outer peripheral side of the opening with respect to a connecting portion between the outer peripheral side portion and the base portion,
whereby when the movable roof panel is closed, the outer peripheral side portion is deformed to be folded toward the outer peripheral side of the opening.

2. A weather strip according to claim 1, wherein the outer peripheral side portion includes a base portion-side section which extends from the base portion toward the outer peripheral side of the opening and a distal end-side section which connects a distal end of the base portion-side section with the distal end of the inner peripheral side portion, and
the distal end-side section extends in a direction which intersects a contact surface of the movable roof panel at substantially a right angle when the movable roof panel is closed.

3. A weather strip mounted on a frame base member which divides a substantially rectangular opening formed in a roof of an automobile into a first opening and a second opening, the weather strip comprising:
a first base portion fixed to the frame base member, and a first hollow seal portion projecting upward from the first base portion;
a second base portion fixed to the frame base member, and a second hollow seal portion projecting upward from the second base portion; and
a connecting portion which connects the first base portion and the second base portion to each other,
wherein, when a first roof panel closes the second opening, the second hollow seal portion is brought into contact with the first roof panel so as to be deformed to seal between the first roof panel and the frame base member, when a movable roof panel closes the first opening, the first hollow seal portion and the second hollow seal portion are brought into contact with the movable roof panel and deformed to seal between the movable roof panel and the frame base member;

wherein the first hollow seal portion includes:
a first inner peripheral side portion which extends substantially from an inner peripheral edge in the first base portion toward an outer peripheral side of the first opening, and
a first outer peripheral side portion connected to a distal end of the first inner peripheral side portion to form a first boundary portion between the first inner peripheral side portion and the first outer peripheral side portion, and connected to the first base portion so that the first hollow seal portion projects upward from the first base portion;
wherein the second hollow seal portion includes:
a second inner peripheral side portion which extends from the second base portion toward the first hollow seal portion, and
a second outer peripheral side portion connected to a distal end of the second inner peripheral side portion to form a second boundary portion between the second inner peripheral side portion and the second outer peripheral side portion, and connected to said second inner peripheral side portion which extends substantially from an inner peripheral edge in the second base portion, so that the second hollow seal portion projects toward the first hollow seal portion;
wherein when the first roof panel is closed, the first roof panel is brought into contact with the second outer peripheral side portion, and when the movable roof panel is closed, the movable roof panel is brought into contact with the first boundary portion of the first hollow seal portion and the second outer peripheral side portion of the second hollow seal portion;
wherein the second boundary portion is located on a side where the first hollow seal portion is provided with respect to a connecting portion between the second inner peripheral side portion and the second base portion, so that the second outer peripheral side portion is deformed to be folded toward the first hollow seal portion, when the movable roof panel is closed, and
the first boundary portion is located on an outer peripheral side of the first opening with respect to a connecting portion between a lower side portion of the first outer peripheral side portion and the first base portion, so that the first outer peripheral side portion is deformed to be folded toward the outer peripheral side of the first opening, when the movable roof panel is closed.

4. A weather strip according to claim 3, wherein the first outer peripheral side portion includes a base portion-side section which extends from the first base portion toward the outer peripheral side of the first opening and a distal end-side section which connects a distal end of the base portion-side section with a distal end of the first inner peripheral side portion,
the distal end-side section extending in a direction which intersects a contact surface of the movable roof panel at substantially a right angle when the movable roof panel is closed.

5. A weather strip according to claim 1, wherein the outer peripheral side portion is made thicker than the inner peripheral side portion.

6. A weather strip according to claim 3, wherein only the boundary portion between the first inner peripheral side portion and the first outer peripheral side portion is brought into contact with the movable roof panel.

* * * * *